United States Patent [19]
Legrand et al.

[11] Patent Number: 5,326,461
[45] Date of Patent: Jul. 5, 1994

[54] OIL FILTER AND HEAT EXCHANGER

[75] Inventors: Guy Legrand, Elancourt; Bernard Blazek, Villenave d'Ornon, both of France

[73] Assignee: Labinal, Montigny, France

[21] Appl. No.: 985,655

[22] Filed: Dec. 7, 1992

[30] Foreign Application Priority Data

Dec. 16, 1991 [FR] France ................... 91 15595

[51] Int. Cl.⁵ .............................. B01D 35/18
[52] U.S. Cl. ................... 210/186; 210/443; 210/453; 165/119
[58] Field of Search ........ 210/186, 443, 459, DIG. 17, 210/184; 165/119, 133, 156, 916

[56] References Cited

U.S. PATENT DOCUMENTS

| | | | |
|---|---|---|---|
| 3,468,371 | 9/1969 | Menze | 165/156 |
| 3,487,670 | 1/1970 | Ware | 165/133 |
| 4,878,536 | 11/1989 | Stenlund | 210/186 |
| 4,923,003 | 5/1990 | Stenlund | 165/165 |
| 4,923,603 | 5/1990 | Maykulsky | 210/168 |
| 4,964,459 | 10/1990 | Stenlund | 210/186 |

FOREIGN PATENT DOCUMENTS

| | | |
|---|---|---|
| 2051973 | 5/1971 | Fed. Rep. of Germany . |
| 2361515 | 6/1975 | Fed. Rep. of Germany . |
| 3317008 | 11/1984 | Fed. Rep. of Germany . |
| 2558045 | 2/1985 | France . |
| WO88/06228 | 8/1988 | PCT Int'l Appl. . |

*Primary Examiner*—Matthew O. Savage
*Attorney, Agent, or Firm*—Larson & Taylor

[57] ABSTRACT

The side wall (8) of the cylindrical casing (1) of an oil filter containing a filtering element (2) consists of a heat exchanger defining two entwined circuits one (6, 14) of which is intended for the oil before its filtration and the other (9, 15) of which is intended for a cooling liquid. Each circuit extends helically and is delimited by a cylindrical sleeve (11, 12) and by a groove (14, 15) hollowed out of an intermediate partition (13).

8 Claims, 1 Drawing Sheet

OIL FILTER AND HEAT EXCHANGER

FIELD OF THE INVENTION

The invention relates to oil filters which comprise, in a cylindrical or substantially such casing, a filtering element.

BACKGROUND OF THE INVENTION

The lubrication oil of internal combustion engines is heated as it works, and if its temperature becomes too high, it risks degrading, which poses problems for its filtration by the filtering element, generally consisting of paper.

In order to overcome this drawback, it has already been proposed to cool the oil just before its filtration by making the side wall of the casing of the oil filter consist of a heat exchanger defining two entwined circuits one of which is intended for the oil before its filtration and the other for a cooling liquid.

The invention relates more particularly, amongst the oil filters of the type in question, to those for which the heat exchanger consists of two coaxial cylindrical sleeves which surround one another, and of an intermediate partition of generally cylindrical shape, but deformed, and arranged in the annular space lying between the two sleeves.

In the known embodiments of these oil filters, the deformed intermediate partition consists of a cylindrical sheet which is folded axially so as to form a succession of grooves and ribs which are annular and of revolution and whose axial half-section exhibits a substantially sinusoidal shape (see document WO-A-88/06228).

These constructions exhibit advantages, but also certain drawbacks, including the following:
- the portion of the oil circuit included by the exchanger, along which portion the heat is transmitted from each of the small volumes of oil to the cooling liquid, extends over a quarter of a circle only,
- the cross-section of the intermediate sheet portion which defines each of the two heat exchange circuits exhibits the shape of a U with smooth walls, which shape is imposed by the folding.

The invention allows these drawbacks to be overcome.

SUMMARY OF THE INVENTION

For this purpose, The oil filters of the type in question according to the invention are characterised in that the two heat exchange circuits are helical and in that each helical circuit is delimited by a helical groove hollowed out of the intermediate partition and by one of the two sleeves, juxtaposed radially against the edges of the said groove.

In advantageous embodiments recourse is further had to one and/or other of the following arrangements:
- the circuit reserved for the cooling liquid comprises several helical segments connected in parallel,
- in a filter according to the preceding point, each helical segment extends over 1.5 turns,
- the cross-section of at least one of the grooves exhibits the general profile of a U with lateral cutouts projecting towards the inside of the U.

The invention comprises, apart from these main arrangements, certain other arrangements which are preferably used at the same time and which will be disclosed in more detail later.

BRIEF DESCRIPTION OF THE DRAWINGS

In that which follows, preferred embodiments of the invention will be described with reference to the appended drawing, and in a manner which is, of course, non-limiting.

DETAILED DESCRIPTION OF THE PREFERRED EMBODIMENTS

Figure 1:
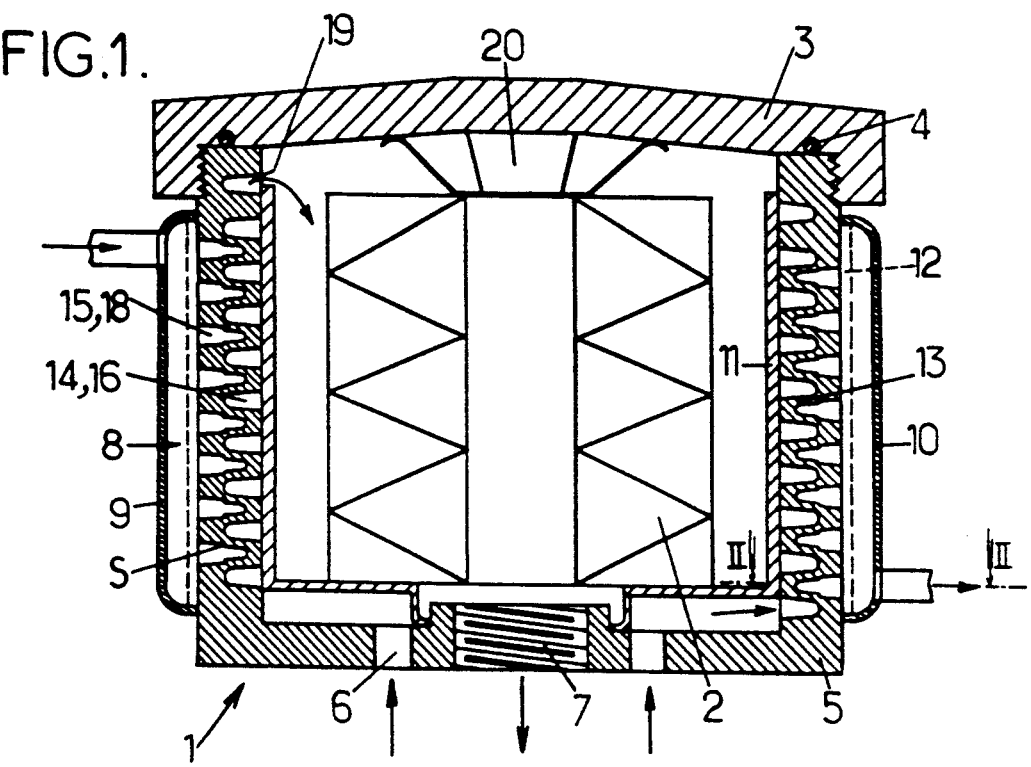
FIG. 1 of this drawing shows, in axial section, an oil filter embodiment according to the invention.

In each case, the oil filter comprises a casing 1 which is cylindrical and of revolution, and in which a removable, disposable or recyclable filtering element 2, which is also cylindrical and of revolution, is housed, and which casing is hermetically closed with the aid of a cover 3 with the interposition of a seal 4.

The casing 1 comprises a bottom 5 in which an eccentric oil inlet 6 and an axial oil outlet 7 are formed, and a side wall 8, on the outer face of which a water inlet 9 and a water outlet 10 are connected in positions which are diametrically opposed to one another in the axial view.

The side wall 8 consists of two coaxial cylindrical sleeves, an internal one 11 and an external one 12 which surround one another, and of an intermediate partition 13 arranged in the annular space between the two sleeves 11 and 12.

The intermediate partition 13 and the bottom 5 may be cast as a single component.

Two helical grooves, an inner one 14 and an outer one 15, are hollowed out of the intermediate partition 13 so as to form a circuit 16, delimited by the groove 14 and the inner sleeve 11, for the oil before its filtration, and a second circuit 17, 18 delimited by the groove 15 and the outer sleeve 12, for the water or for any other suitable cooling liquid.

The grooves 14 and 15 may have been moulded as a single piece with the partition 13. They may also be machined in this partition. They advantageously exhibit a profile which is different from a simple U with smooth walls, this U comprising, for example, on its wings, continuous or discontinuous coarseness or roughness, or even continuous or discontinuous cutouts or shoulders S projecting from the said wings, so as to improve the turbulence of the liquid which flows along them, and thus the efficiency of the heat exchange. It is easy to produce these projections S or the like during moulding or machining of the grooves.

The first circuit 16 is formed from a single helical passage 14, extending from the lower oil inlet 6 to an upper opening 19 opening inside the casing 1.

Figure 3:
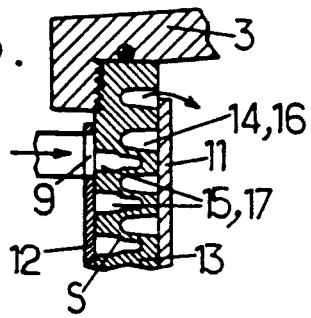
FIG. 3 shows a portion of a variant of this embodiment, also in accordance with the invention.

The second circuit may also be formed by a single helical passage 17 (FIGS. 3 and 4), in which case the inlet 9 and outlet 10 are in the form of simple orifices hollowed out of the partition 12 and extending towards the outside by radial connections.

Figure 2:
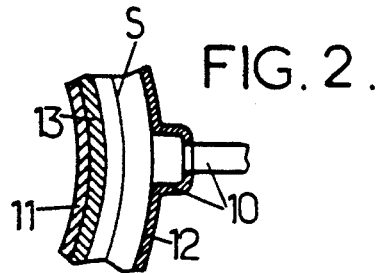
FIG. 2 is a partial transverse section of this FIG. 1 along II—II, FIG. 1.

However, the said second circuit is preferably formed by several helical segments 18 (FIGS. 1, 2 and 5), mounted in parallel and each extending over a length of approximately 1 or 2 turns, and advantageously each extending over a length of one and a half turns, between the two zones 9 and 10: in this case, the inlet 9 and the outlet 10 are in the form of outer longitudinal ribs formed in the partition 12 and hollowed out in the vicinity of their ends by orifices themselves extended towards the outside by radial connections.

In each case, an annular spring 20, interposed axially between the filtering element 2 and the cover 3, both correctly positions this element in the casing and separates the upstream and downstream faces of the said element in a sealed fashion, which forces all the oil to pass through this element.

Figure 4:
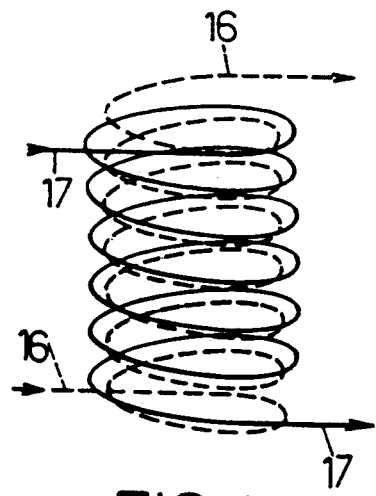
FIGS. 4 and 5 show, in a very simplified manner, the exchange of heat in the two filters above.
Figure 5:
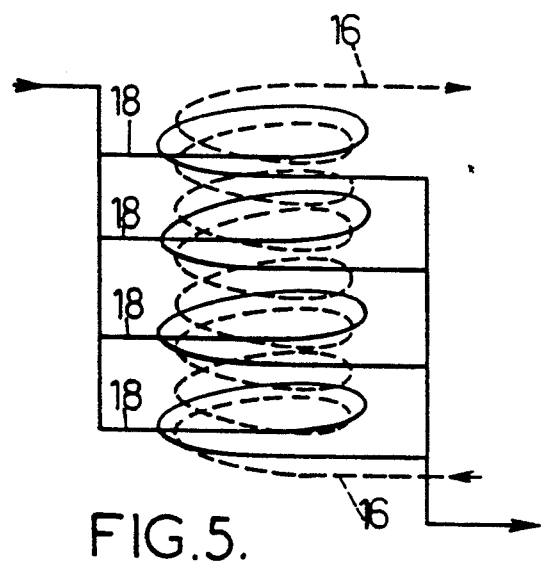

FIGS. 4 and 5 diagrammatically show the exchange of heat prevailing in the exchangers respectively comprising, for the water, a single helical segment 17 (FIG. 4), and several parallel helical segments 18 (FIG. 5), the cooling water circulating in the two systems an a counter-current fashion with respect to the oil.

In the exchanger represented in FIG. 4, the oil, which enters the helical passage 16 at a high temperature, loses, during its travel along the said passage, part of its heat by heat exchange with the cold water circulating in the single helical segment 17. Apart from the desired drop in the temperature of the oil, a continuous heating of the water results therefrom, right along this single segment, which has the effect that, when the oil comes into thermal contact with the water, the latter is already heated to a temperature which is greater than its inlet temperature.

The exchanger represented in FIG. 5 differs from that represented in FIG. 4 in that the volume of water participating in the heat exchange is subdivided into several partial volumes each of which takes one of the parallel helical segments 18. The effect is that the oil, as it comes into thermal contact with each partial volume of water, encounters water whose temperature is relatively close to its inlet temperature: thus the cooling of the oil is more efficient than with the previous exchanger.

In each case, if the filter equips an internal combustion engine, it is advantageously mounted in the cooling circuit of this engine, the cooling liquid of the engine then being used at the same time for cooling the said filter.

We claim:

1. An oil filter for filtering a flowing oil comprising:
    a filtering element for filtering the oil, said filtering element having an inlet side and an outlet side; and
    a substantially cylindrical enclosed casing including
        an oil inlet and an oil outlet between which said filtering element is disposed so that the oil flowing from said oil inlet to said oil outlet must pass through said filter element,
        a closed top end and a closed bottom end,
        a side wall between said top end and said bottom end including
    a) an inner cylindrical sleeve,
    b) an outer cylindrical sleeve coaxial with and surrounding said inner cylindrical sleeve so that an annular space is provided therebetween, and
    c) an intermediate portion provided in the annular space and including (i) a radially inner portion in which an inner helical groove is hollowed out to define an inner circuit with said inner cylindrical sleeve and (ii) a radially outer portion in which an outer helical groove is hollowed out to define an outer circuit with said outer cylindrical sleeve which said outer circuit is entwined with said inner circuit for mutual heat exchange, wherein (i) said inner helical groove defines an oil circuit having an upstream end in communication with said oil inlet and a downstream end in communication with the inlet side of said filtering element, (ii) the outer helical groove defines a cooling liquid circuit having a cooling liquid inlet and a cooling liquid outlet, and (iii) said radially inner portion having said inner helical groove defining said oil circuit has said inner cylindrical sleeve adjacent thereto and being in tight mutual contact therewith so that oil circulating in said oil circuit follows substantially all of said inner helical groove between said upstream end and said downstream end;
    first means for providing fluid communication solely between the inlet and the upstream end of said inner helical groove;
    second means for providing fluid communication solely between the downstream end of said inner helical groove and the inlet side of said filtering element; and
    third means for providing fluid communication solely between the outlet side of said filtering element and said outlet.

2. An oil filter as claimed in claim 1 wherein said cooling circuit comprises several helical segments connected in parallel between said cooling liquid inlet and said cooling liquid outlet; and wherein said cooling liquid inlet and said cooling liquid outlet each include an axial groove and an associated orifice provided in said sleeve adjacent thereto.

3. An oil filter as claimed in claim 2 wherein each said helical segment extends over 1.5 turns.

4. An oil filter as claimed in claim 2 wherein at least one of said grooves has a cross section which is generally U shaped, the U shape including shoulders projecting towards an inside of the U shape along each leg of the U shape.

5. An oil filter as claimed in claim 1 wherein at least one of said grooves has a cross section which is generally U shaped, the U shape including shoulders projecting towards an inside of the U shape along each leg of the U shape.

6. An oil filter as claimed in claim 1 wherein said bottom and said intermediate portion are integrally formed.

7. An oil filter as claimed in claim 6 wherein said closed top end is a removable cover sealed to said intermediate portion.

8. An oil filter as claimed in claim 7 wherein said closed bottom end includes said oil inlet and said oil outlet, wherein said oil outlet is central located; and wherein said filter element is a cylindrical and hollow member disposed laterally about said oil inlet.

* * * * *